(12) United States Patent
Ozeki et al.

(10) Patent No.: US 8,581,123 B2
(45) Date of Patent: Nov. 12, 2013

(54) TOUCH PANEL

(75) Inventors: Masao Ozeki, Yokohama (JP); Takashi Shimada, Matsudo (JP); Kiyoshi Watanabe, Kashiwa (JP)

(73) Assignee: OPTREX Corporation, Tokyo (JP)

( * ) Notice: Subject to any disclaimer, the term of this patent is extended or adjusted under 35 U.S.C. 154(b) by 27 days.

(21) Appl. No.: 13/242,515

(22) Filed: Sep. 23, 2011

(65) Prior Publication Data

US 2012/0081333 A1    Apr. 5, 2012

(30) Foreign Application Priority Data

Oct. 1, 2010  (JP) .................................. 2010-224404

(51) Int. Cl.
*G06F 3/042* (2006.01)
*G06F 3/044* (2006.01)

(52) U.S. Cl.
USPC ........................................ 178/18.06; 345/174

(58) Field of Classification Search
USPC ........................................ 345/174; 178/18.06
See application file for complete search history.

(56) References Cited

U.S. PATENT DOCUMENTS

| 2008/0264699 | A1* | 10/2008 | Chang et al. ............... 178/18.01 |
| 2008/0309635 | A1 | 12/2008 | Matsuo |
| 2010/0295819 | A1 | 11/2010 | Ozeki et al. |
| 2011/0157086 | A1 | 6/2011 | Ozeki et al. |

FOREIGN PATENT DOCUMENTS

| JP | 60-75927 | 4/1985 |
| JP | 2008-310550 | 12/2008 |
| JP | 3152611 U * | 8/2009 |

OTHER PUBLICATIONS

Machine Translation of JP 3152611 U.*

* cited by examiner

*Primary Examiner* — Liliana Cerullo
*Assistant Examiner* — Randal Willis
(74) *Attorney, Agent, or Firm* — Oblon, Spivak, McClelland, Maier & Neustadt, L.L.P.

(57) ABSTRACT

A touch panel includes a plurality of first and second transparent electrodes extending in first and second directions on one side of a transparent substrate. One of a couple of adjacent electrodes of the first electrodes and a couple of adjacent electrodes of the second electrodes at each of crossing portions has no interruption while the adjacent electrodes of the other couple are interrupted. A transparent interlayer insulting film is disposed as an upper layer on the one couple at each of the crossing portions. A metal bridge electrode is an upper layer on the interlayer insulting film to connect between the adjacent electrodes of the other couple. Each of the coupling portions has a greater length than the bridge portion.

5 Claims, 10 Drawing Sheets

TOUCH PANEL

BACKGROUND OF THE INVENTION

1. Field of the Invention

The present invention relates to a touch panel.

2. Discussion of Background

Electronic devices, such as a cellular telephone, a smart phone and a PDA (personal digital assistant), have a limited area for placing an input unit, such as a switch or a digital keypad since they are required to have a large screen. Further, it is required to realize information input measures which a user can input information in an easy-to-understand manner by touching a display image while seeing the image displayed on the display element, such as a liquid crystal display.

Thus, a demand to provide a display with a touch panel has recently increased.

A touch panel is placed on a display element, such as such an above-mentioned liquid crystal display, and is a generic term of input units, which detect where a touch is made, when a user touches an operation screen by his or her finger, a pen or the like. The system for detecting where a touch is made is classified into a resistive touch film system, a capacitive touch system and the like.

In such a resistive touch film system, two substrates, each of which has transparent electrodes thereon, are disposed so as to be spaced from each other with the transparent electrodes on both substrates confronting. In other words, it is difficult to reduce the thickness since such two substrates are needed. Conventional resistive touch film panels are configured such that a substrate is pressed to short-circuit opposed electrodes. For this reason, such conventional resistive touch film panels have a low durability because wear or the like is likely to be caused.

On the other hand, such a capacitive touch system is particularly appropriate to portable electronic devices because of being capable of being configured so as to employ a single substrate, reducing the thickness. In this system, a projected capacitive touch system has been frequently employed.

In such a projected capacitive touch system, a user's finger serves as ground since the user works as an electrical conductor. In other words, when a finger is brought close to a sensing electrode disposed on the substrate of a touch panel, a capacitance is formed between the finger and the electrode, and such a capacitance change is detected by, e.g. a control circuit. In this case, it is not necessary for the finger to be brought into direct contact with the sensing electrode since the proximity of the user's finger is detected as such a capacitance change.

Such a projected capacitive touch system needs to be subjected to patterning of transparent sensing electrodes for detection. Recently, the most frequently used technology is to disposes X-electrodes extending in an X-direction and Y-electrodes extending in a Y-direction in a lattice pattern on one side of a substrate.

JP-A-60-75927 discloses a capacitive tough panel technology where a plurality of X-transparent conductive strips (X-electrodes) and a plurality of Y-transparent conductive strips (Y-electrodes) are disposed on a transparent substrate, such as a glass substrate, so as to be isolated through an insulating film.

In such a projected capacitive touch system, it is necessary to dispose an electrode and an electrode so as to cross each other on a glass substrate forming a touch panel as disclosed in JP-A-60-75927.

With regard to the connection structure between both electrodes in such a case, e.g. JP-A-2008-310550 discloses a configuration example of a capacitive input unit, which includes a first transparent electrode pattern and a second transparent electrode pattern disposed on one side of a transparent substrate, wherein the second transparent electrode pattern, which is interrupted at portions where both patterns cross each other, is electrically connected by a relay electrode disposed as an upper layer on an interlayer insulating film at each of the crossing portions.

SUMMARY OF THE INVENTION

For example, JP-A-2008-310550 discloses that the interlayer insulating film is formed of a photosensitive resin, and that each of the transparent electrode patterns or the relay electrode is made of ITO (Indium Tin Oxide). However, the inventors have found that the use of a resin for formation of the interlayer insulating film could cause a problem of poor adhesion performance for the ITO (Indium Tin Oxide) or the like, depending on the property of the used resin material, when each of the transparent electrode patterns or the relay electrode is formed of ITO (Indium Tin Oxide).

More specifically, in this type of connection structure, the interlayer insulating film peels from the ITO electrode to lift in some cases since the adhesion of the resin interlayer insulating film to the ITO electrode is poor. In such cases, the relay electrode, which is disposed as the upper layer of the interlayer insulating film, also lifts and interrupts the connection between the opposed electrodes. The problem of relay electrode lift is assisted by a pressing action that is formed when a user's finger is not brought into contact with the operation screen. Although the projected capacitive touch system is capable of making detection even if a user's finger is not brought into contact with the operation screen, this problem is also involved in the projected capacitive touch system since a user' finger is brought into contact with the operation screen so many times.

When a user touches a touch panel, static electricity is applied to the touch panel in some cases. In such cases, a high current flows in an electrode or electrodes of the touch panel. The touch panel is required to have a highly reliable electrode structure that can withstand a high current caused by the application of static electricity.

The present invention is proposed based on the problem of ITO electrodes employed in the above-mentioned touch panel and the demand for an electrode structure, which is capable of coping with a high current caused by the application of static electricity.

It is an object of the present invention to provide a reliable touch panel, which is capable of avoiding the problem involved in ITO electrodes and the problem of resistance to the application of static electricity.

Other objects and advantages of the present invention will become better understood with regard to the following description.

The present invention provides a capacitive touch panel, which includes:

a transparent substrate;

a plurality of first transparent electrodes extending in a first direction on one side of the substrate;

a plurality of second transparent electrodes extending in a second direction crossing the first direction on the one side of the substrate with the first transparent electrodes disposed thereon;

one of a couple of adjacent electrodes of the first electrodes and a couple of adjacent electrodes of the second electrodes at each of crossing portions having no interruption, the adjacent electrodes of the other couple being interrupted, and the adjacent electrodes of the interrupted couple being connected by a bridge electrode; and an interlayer insulting film disposed between the one couple and the bridge electrode;

wherein the bridge electrode is formed of a metal material and has coupling portions disposed on the adjacent electrodes of the other couple interrupted at each of the crossing portions and a bridge portion connecting between the coupling portions; and each of the coupling portions has a greater length than the bridge portion in a direction orthogonal to a direction for a current to flow into the bridge portion from an electrode of the other couple.

In a mode of the present invention, it is preferred that each of the coupling portions be formed in a shape having a long axis in the direction orthogonal to the direction for the current to flow into the bridge portion from an electrode of the other couple.

In another mode of the present invention, it is preferred that each of the coupling portions have a length of at least 40 μm in the direction orthogonal to the direction for the current to flow into the bridge portion from an electrode of the other couple.

In a mode of the present invention, it is preferred that the bridge electrode include two coupling portions disposed on the adjacent electrodes of the other couple interrupted at each of the crossing portions, and the bridge portion connecting between the two coupling portions, and that each of the two coupling portions be formed in a strip shape having a long axis in the direction orthogonal to the direction for the current to flow into the bridge portion from an electrode of the other couple, and the two coupling portions have first sides opposing each other and second sides remote from the respective first sides, the second sides having a corner rounded at a radius of R. It is preferred that the radius of R be at least 9 μm.

In a mode of the present invention, a gap may be formed between the interlayer insulating film on the one couple and the other couple at each of the crossing portions such that the bridge electrode on the interlayer insulating film is bonded to the substrate through the gap.

In accordance with the present invention, there is provided a reliable touch panel, which is capable of avoiding the problem involved in ITO electrodes and the problem of resistance to the application of static electricity.

DETAILED DESCRIPTION OF THE PREFERRED EMBODIMENTS

As described above, in a projected capacitive touch panel, a plurality of transparent X-electrodes and a plurality of transparent Y-electrodes are disposed in a lattice pattern on a single transparent substrate, such as a glass substrate, by patterning of the transparent sensing electrodes for detection. Adjacent X-electrodes or adjacent Y-electrodes, which are interrupted at each of crossing portions, are electrically connected by a bridge electrode for relay, which is disposed as an upper layer on an interlayer insulating film.

When such a bridge electrode is disposed on a resin interlayer insulating film by use of an ITO material in this process, the above-mentioned problem is caused. Therefore, the inventors have made a study on a new structure, which forms such a bridge electrode by use of a material having a higher adhesion performance to a substrate, such as metal, in the electrode structure for a touch panel.

Figure 9:
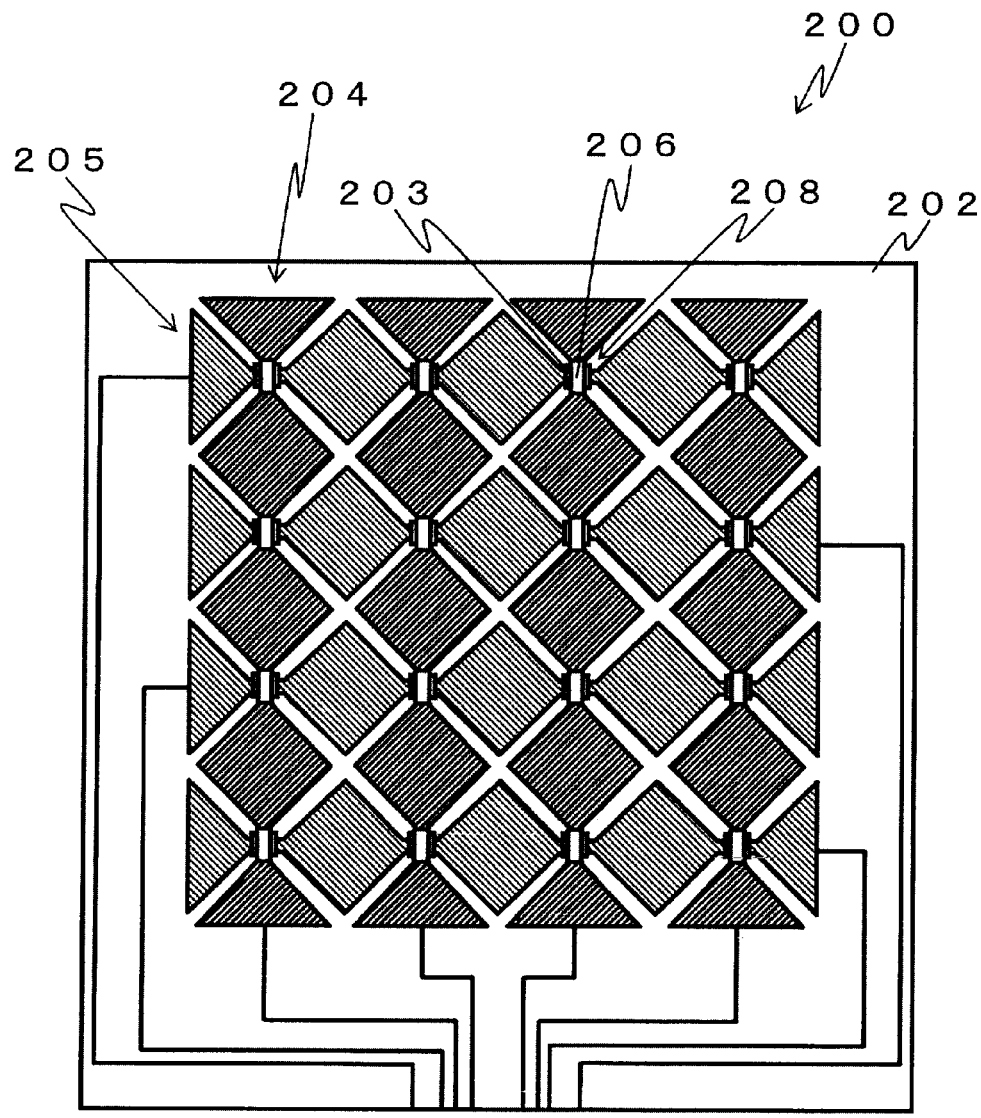
FIG. 9 is a plan view explaining a schematic structure of a touch panel having metal bride electrodes.
Figure 10:
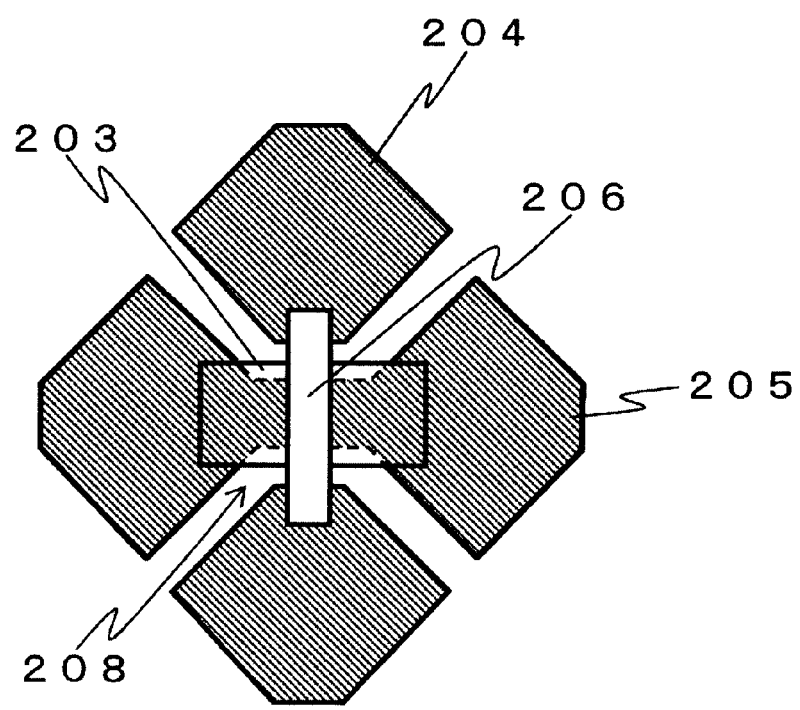
FIG. 10 is a schematic view showing, in enlargement, a bridge electrode of the touch panel shown in FIG. 9 and the surroundings thereof.

FIG. 9 is a plan view explaining a schematic structure of a touch panel having metal bride electrodes. FIG. 10 is a schematic view showing, in enlargement, a bridge electrode of the touch panel shown in FIG. 9 and the surroundings thereof.

The touch panel 200 shown in FIG. 9 has a plurality of X-electrodes 205 and a plurality of Y-electrodes 204 disposed on a single side of a transparent substrate 202, such as a glass substrate, the plurality of X-electrodes 205 and the plurality of Y-electrodes 204 extending in two different directions of an X-axis and a Y-axis, which cross each other. The plurality of X-electrodes 205 and the plurality of Y-electrodes 204 are disposed such that an interlayer insulating film 203 is interposed therebetween at each of crossing portions where the plurality of X-electrodes and the plurality of Y-electrodes cross each other, whereby the plurality of X-electrodes and the plurality of Y-electrodes are electrically disconnected (independent).

Although the electrode pattern forming the X-electrodes 205 is not interrupted at a crossing portion 208 as shown in FIG. 10, the electrode pattern forming the Y-electrodes 204 is interrupted at the crossing portion. Adjacent Y-electrodes 204 are electrically connected by a bridge electrode 206, which is disposed as an upper layer on the interlayer insulating film 203.

The bridge electrode 206 is a metal electrode and is formed in a strip shape, which has a long axis in a direction in parallel to a current flowing in the bridge electrode 206 between the adjacent Y-electrodes 204 as shown in FIG. 10. The metal electrode reduces the amount of light transmission in some cases because of reflecting light. From this point of view, the bridge electrode 206 preferably has a minimized size, i.e. the bridge electrode 206 preferably has a thin width and a short length. Thus, the touch panel 200 prevents the bridge electrode from being noticeable on the touch panel and from making the touch panel look horrible.

However, static electricity is applied to flow a high current in a bridge electrode 206 in the touch panel 200 in some cases as described above. In such a case, when the coupling portion between the bridge electrode and a Y-electrode coupled thereto has a small contact area, heat is generated by current concentration. Such a phenomenon breaks the coupling portion between the bridge electrode and the Y-electrode in some cases.

In the present invention, each bridge electrode, which connects adjacent Y-electrodes or adjacent X-electrodes interrupted in each of the crossing portions, is formed of metal. The present invention provides a touch panel, which improves the shape of each bridge electrode to withstand a high current due to static electricity.

Now, the touch panel according to an embodiment of the present invention will be described in detail in reference to the accompanying drawings.

Figure 1:
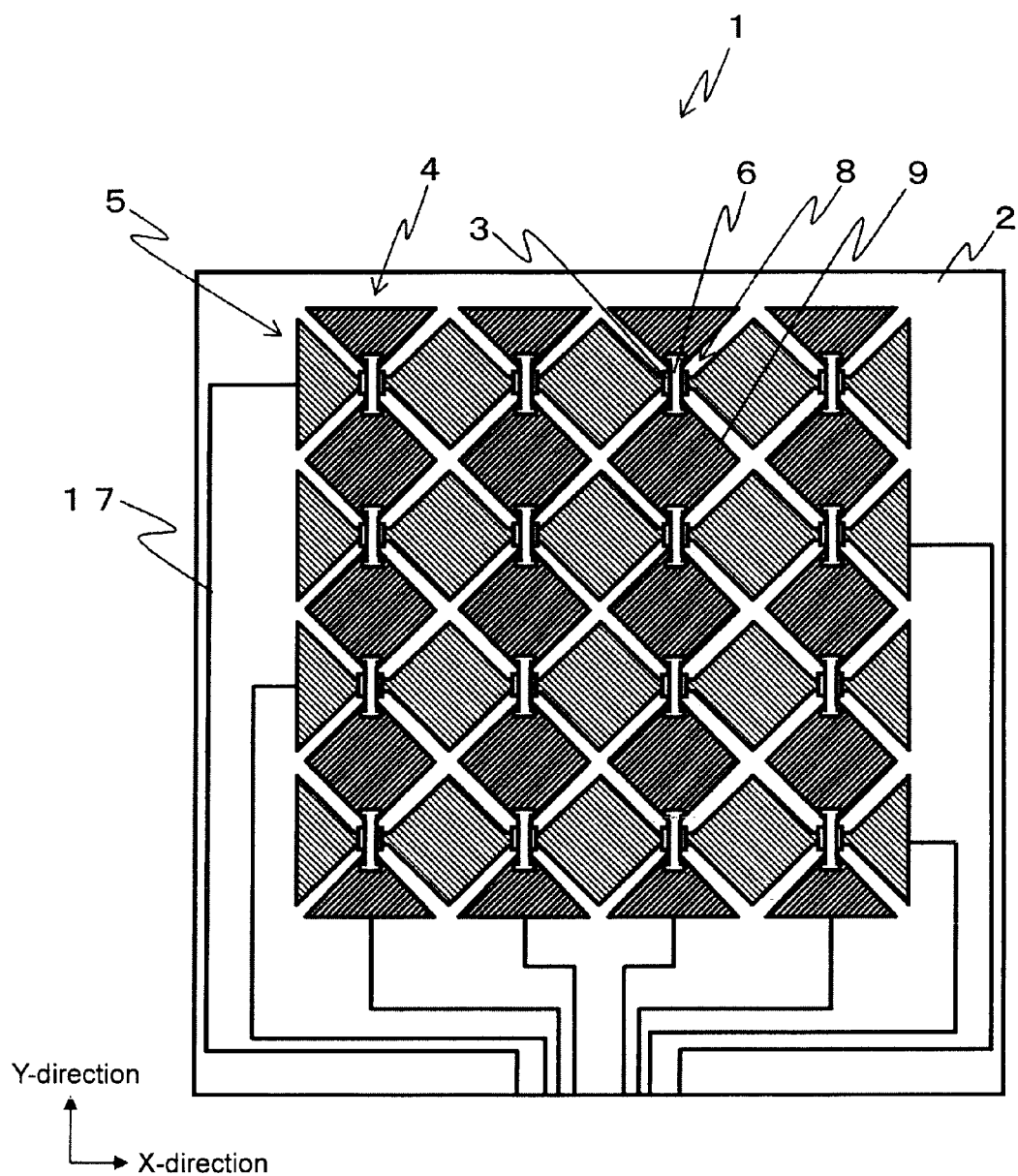
FIG. 1 is a plan view explaining a schematic structure of the tough panel according to an embodiment of the present invention.
Figure 2:
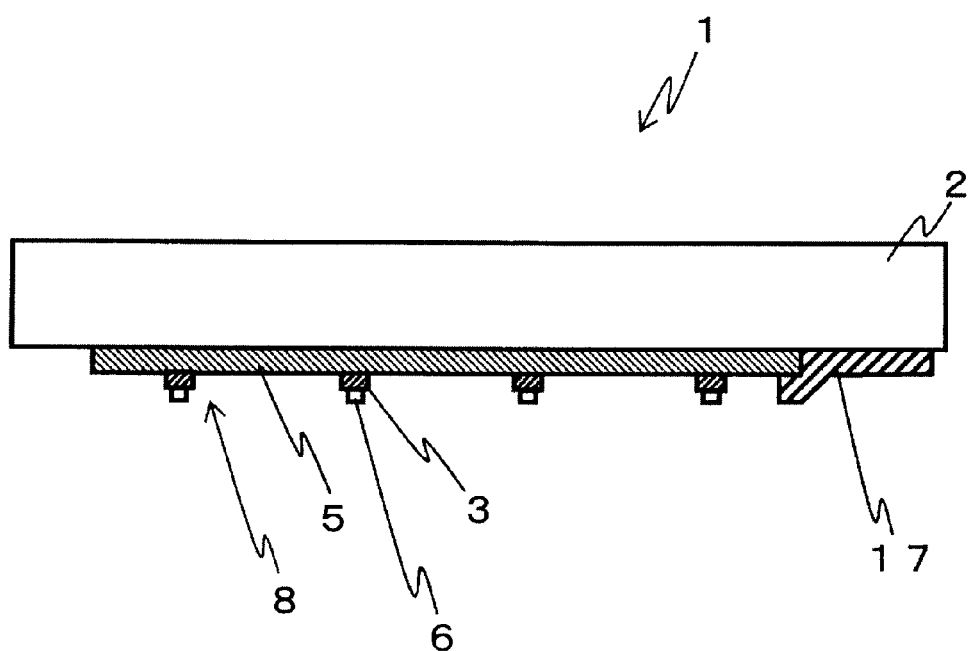
FIG. 2 is a cross-sectional view explaining the schematic structure of the tough panel according to the embodiment.
Figure 3:
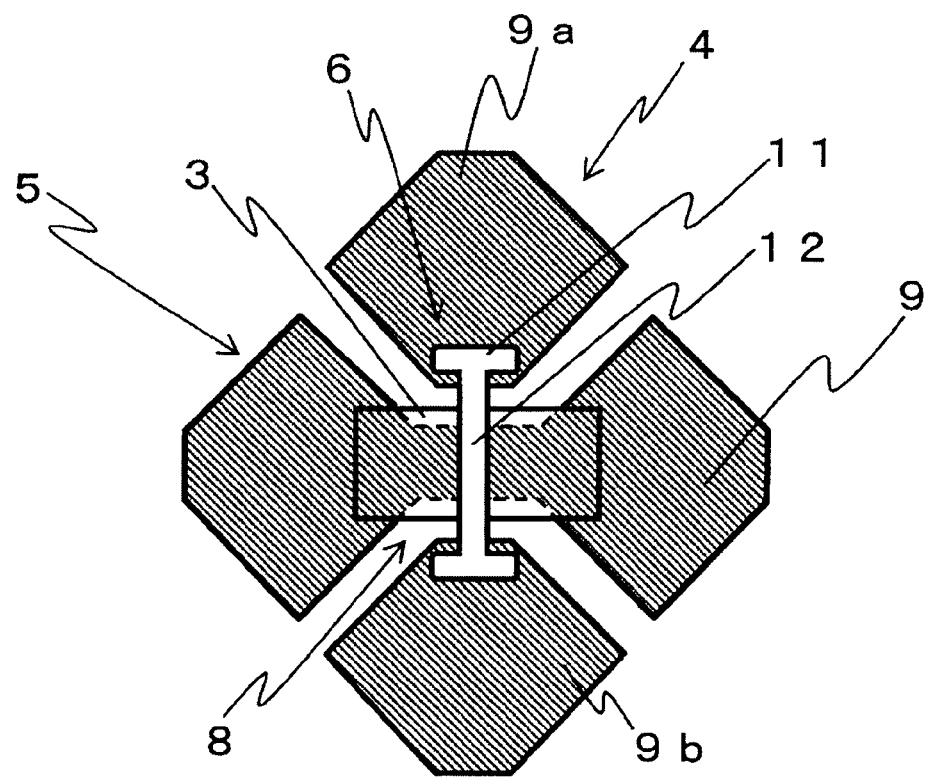
FIG. 3 is a schematic view explaining the structure of a crossing portion of the touch panel according to the embodiment.

FIG. 1 is a plan view explaining a schematic structure of the tough panel according to the embodiment of the present invention. FIG. 2 is a cross-sectional view explaining the schematic structure of the tough panel according to the embodiment. FIG. 3 is a schematic view explaining the structure of a crossing portion of the touch panel according to the embodiment.

The touch panel 1 shown in FIGS. 1 and 2 has a plurality of first electrodes 4 and a plurality of second electrodes 5 disposed on a single side of a transparent substrate 2 as a light-transmitting substrate. The plurality of first electrodes 4 and the plurality of second electrodes 5 correspond to the plurality of Y-electrodes 204 and the plurality of X-electrodes 205 of the touch panel shown in FIG. 9.

The transparent substrate 2 is an electrically insulating substrate, which may be, for example, a glass substrate, a PET (polyethylene terephthalate) film or a PC (polycarbonate) film. When the transparent substrate is a glass substrate, the transparent substrate may have a thickness of 0.3 mm to 3.0 mm.

The first electrodes 4 and the second electrodes 5 are also all similar light-transmitting electrodes (hereinbelow, also referred to as the transparent electrodes) and are disposed on an area working as the operation screen of the touch panel 1. The first electrodes 4 and the second electrodes 5 are formed of a transparent material, which has a high transmittance to visible light and a high conductivity. The first electrodes and the second electrodes may be formed of, e.g. ITO (Indium Tin Oxide), IZO (Indium Zinc Oxide) or ZnO (Zinc Oxide).

As shown in FIG. 1, the first electrodes 4 extend in a Y-direction on the transparent substrate 2 while the second electrodes 5 extend in an X-direction orthogonal to the Y-direction on the transparent substrate. The plurality of first electrodes and the plurality of second electrodes are disposed in a lattice pattern on the transparent substrate 2. The plurality of first electrodes 4 divides the operation screen of the touch panel 1 into a plurality of areas to detect a coordinate in the X-direction. The plurality of second electrodes 5 serves to detect a coordinate in the Y-direction in a similar way. On the touch panel 1, the plurality of first electrodes 4 and the plurality of second electrodes 5 are electrically independent from each other so as to detect where a touch is made, as describe later.

As shown in FIG. 1, the first electrodes 4 and the second electrodes 5 may have such a shape that plural diamond-shaped electrode pads 9 are aligned in the Y-direction and the X-direction. As shown in FIG. 3 in enlargement, the second electrodes 5 are patterned so as to connect between adjacent electrodes at each of the crossing portions 8 where the plurality of first electrodes 4 and the plurality of second electrodes 5 cross each other, while the first electrodes 4 are patterned so as to be interrupted between adjacent electrodes. In other words, as shown in FIG. 3, the second electrodes 5 are electrically connected between adjacent electrodes, while the first electrodes 4 are interrupted between adjacent electrodes. The electrical connection between the interrupted portions of the first electrodes 4 is established by the bridge electrodes 6 as described later.

The first electrodes 4 and the second electrodes 5 may be formed of such diamond-shaped electrode pads 9 in order to increase the detection performance of the touch panel. However, the present invention is applicable not only to a case where the electrode pads 9 are formed in a diamond-shape, but also to a case where the electrode pads are formed in any other shape, such as a hexagonal shape or an octagon shape. The number of the first electrodes 4 and the number of the second electrodes 5 are not limited to the shown ones. The shape and the number of the electrodes may be determined, depending on the size of the operation screen and required accuracy of a detected position.

In the touch panel 1 according to the embodiment shown in FIG. 1, the first electrodes 4 and the second electrodes 5 are disposed as the same layer on the same side of the transparent substrate 2 as described above. In other words, there are many crossing portions 8 where the first electrodes 4 and the second electrodes 5 cross each other. At each of the crossing portions 8, the second electrodes 5, which are patterned so as to be connected between adjacent electrodes, have an interlayer insulating film 3 disposed as an upper layer on the second electrodes 5. The interrupted portions of the first electrodes 4 are electrically connected by the bridge electrodes 6, which are disposed as an upper layer on the interlayer insulating film 3. In other words, the interlayer insulating film 3 is disposed between a bridge electrode 6 and adjacent electrodes of the second electrodes 5 at each of the crossing portions 8. The interlayer insulating film 3 is disposed only at each of the crossing portions where the bridge electrodes 6 are disposed.

The interlayer insulating film 3 preferably has a light-transmissive property because of being formed of a light transmissive and insulating material. The interlayer insulating film may be formed of, e.g. an inorganic material, such as $SiO_2$, or an organic material, such as a photosensitive acrylic resin. When $SiO_2$ is employed, it is possible to readily obtain the insulating film by patterning by use of a mask in a sputtering method. When such a photosensitive acrylic resin or the like is employed to dispose the interlayer insulating film, it is possible to obtain the interlayer insulating film 3 by patterning the resin by use of a photolithographic technique.

In particular, when the transparent substrate 2 is a glass substrate, it is preferred to employ a photosensitive resin, which has a group reactive with a silanol group generated on the glass substrate. By employing such a photosensitive resin, it is possible to provide the insulating layer with a high adhesion property due to chemical bond between the glass substrate and the photosensitive resin. Preferred examples of the photosensitive resin include photosensitive methacrylic resin, photosensitive polyimide resin, photosensitive polysiloxane resin, photosensitive polyvinyl alcohol resin and acrylic-urethane-based photosensitive resin in addition to the above-mentioned photosensitive acrylate resin. The interlayer insulating film may be formed a light blocking insulating material. When such a light blocking insulating material is employed, it is preferred that the area where the interlayer insulating film 3 is disposed should be minimized from the viewpoint of visibility.

The bridge electrodes 6 according to this embodiment are preferably formed of a metal material. The metal material is an appropriate material because of having a high adhesion property to the transparent substrate 2. When the transparent substrate 2 is a glass substrate, it is preferred to employ a material, which has a high adhesion property to the glass substrate, has a higher conductivity than ITO and is excellent in wear resistance. Specific examples of the metal material include Mo, a Mo alloy, Al, an Al alloy, Au and a Au alloy. Preferred examples of an alloy having an improved corrosion resistance include a Mo—Nb-based alloy and an Al—Nd-based alloy.

The above-mentioned bridge electrodes 6 may have a multi-layer structure, such as a two-layer structure or a three-layer structure. An example of the multi-layer structure is a three-layer structure of Mo-layer/Al-layer/Mo-layer.

When the bridge electrodes 6 are formed of such a metal material, it is possible to make the electrode width narrower and make the electrode length longer in comparison with a case where the bridge electrodes 6 are formed of an ITO material. It is also possible to reduce the electrode film thickness. Such bridge electrodes 6 can increase the degree of freedom in designing of the electrode structure and have a better appearance.

Each of the bridge electrodes 6 according to this embodiment is preferably configured to have a bridge portion 12 and coupling portions 11. For example, the structure shown in FIG. 3 and described later is preferred.

The bridge portions 12 of the bridge electrodes 6 work to bridge the interrupted portions of the first electrodes 4. The respective coupling portions 11 are disposed on the electrode pads 9 forming the first electrodes 4 to connect between the respective bridge electrodes 9 and the respective first electrodes 4. In other words, the respective paired coupling portions 11 are disposed on the respective paired adjacent electrode pads 9, which form the first electrodes 4 and are interrupted at the crossing portions 8. The respective bridge portions 12 connect the respective paired coupling portions 11. The respective bridge electrodes 6 include the respective paired coupling portions 11 disposed on the first electrodes 4 interrupted at the respective crossing portions 8, and the respective bridge portions 12 connecting the respective paired coupling portions.

The connection area between the first electrodes 4 and the bridge electrodes 6 are increased since the bridge electrodes 6 have the coupling portions 11. Thus, a current, which flow between each first electrode 4 and its related bridge electrode 6, can be prevented from concentrating at their connection part. In this way, it is possible not only to prevent heat generation or disconnection from occurring at their connection part but also to reduce the area of the bridge electrodes 6, in particular the area of the bridge portions 12.

The bridge electrodes 6 have the above-mentioned structure and function. The respective parts of the bridge electrodes, such as the coupling portions 11, may be formed in any desired shape.

Specifically, the bridge portion 12 and the coupling portions 11 of each of the bridge electrodes are preferably formed in such a shape that the coupling portions 11 have a greater length than the bridge portion 12 in a direction orthogonal to a direction for a current to flow in the bridge portion 12 between the adjacent first electrodes 4 (hereinbelow, referred to as the current direction).

For example, the bridge portion 12 of each of the bridge electrodes 6 is preferably formed in a shape having a long axis in a direction parallel to the current direction. The coupling portions 11 of each of the bridge electrodes are preferably formed in a shape having a long axis in a direction orthogonal to the current direction. The coupling portions 11 of each of the bridge electrodes can control the concentration of a current in the coupling portions between the adjacent first electrodes 4 and the bridge electrode 6 of each of the bridge electrodes by adjusting the length in the direction orthogonal to the current direction. Specifically, it is preferred that the coupling portions have a length of at least 40 µm in the long-axis direction. In this case, it is preferred that the coupling portions have a length of at most 20 µm in a short-axis direction.

As the specific shape of each of the bridge electrodes 6, the shape shown in FIG. 3 may be selected for example. It should be noted that the shape of each of the bridge electrodes 6 is not limited to the example shown in FIG. 3 in this embodiment.

As shown in FIG. 3, the bridge portion 12 of each of the bridge electrodes 6 is formed in such a shape to extend in a direction parallel to the current direction. On the other hand, the respective paired coupling portions 11 of each of the bridge electrodes are disposed on the respective adjacent first electrodes 4 and are formed in such a shape to extend in the direction orthogonal to the current direction.

More specifically, the bridge portion 12 of each of the bridge electrodes 6 is formed in a strip shape having its long axis in the direction parallel to the current direction. Each of the coupling portions 11 is also formed in a strip shape and has its long axis in the direction orthogonal to the current direction.

As shown in FIG. 3, each of the bridge electrodes 6 is formed, as a whole, in a shape that its coupling portions 11 and its bridge portion 12 are combined in an H-letter shape where the alphabetical letter of "H" turns through 90 degrees. In each of the bridge electrodes 6, the coupling portions 11 may be combined to the bridge portion 12 so as to make the bridge portion in a thin shape.

Thus, the touch panel can prevent the metal bridge electrodes from being noticeable with the connection area between the first electrodes 4 and the bridge electrodes 6 increasing. Even if a high current flows due to the application of static electricity, the touch panel can prevent the current from concentrating at the connection between a first electrode 4 and its relevant bridge electrode 6, whereby the heat generation at the connection, consequently, disconnection can be prevented.

The coupling portions 11 of each of the bridge electrodes 6 are preferably formed in a shape to have no sharp part in the leading edges in the Y-direction (in the vertical direction in FIG. 3). When there is a sharp part in a leading edge in the Y-direction, the above-mentioned problem is likely to be caused since a current concentrates at that part.

Figure 4:
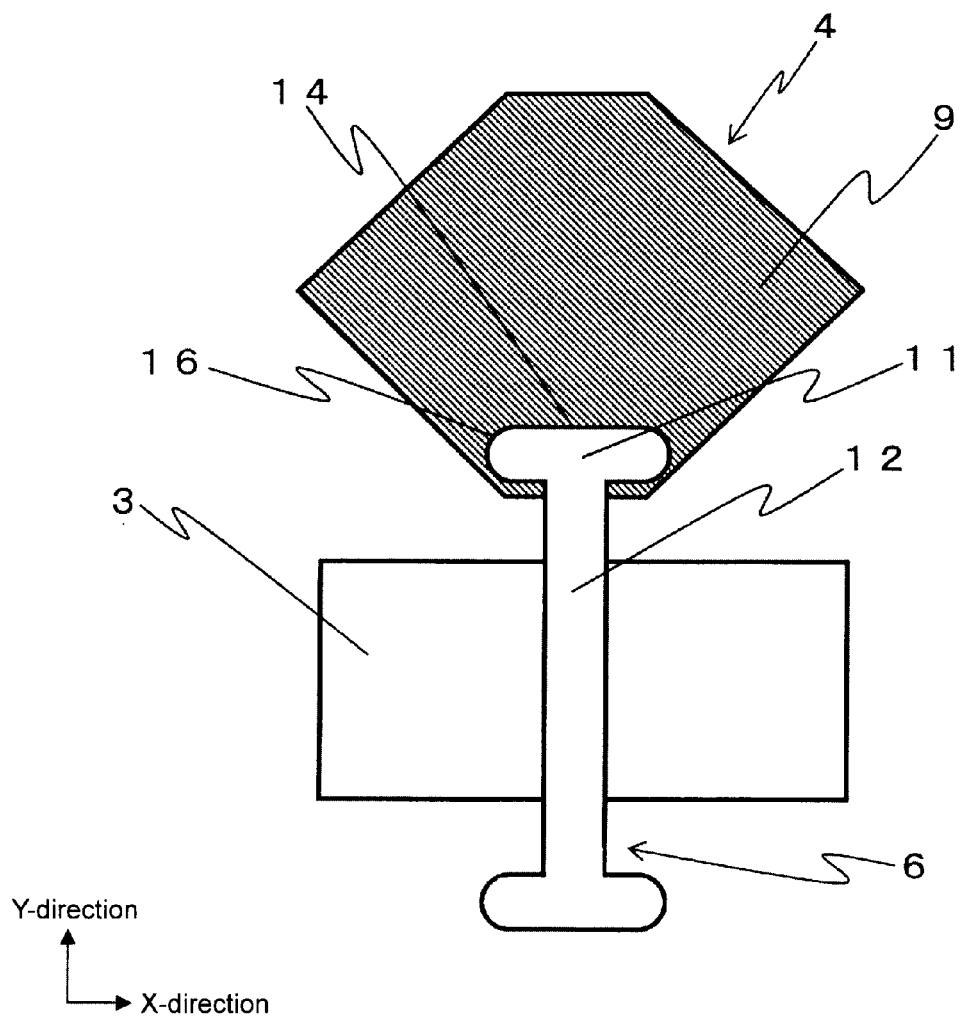
FIG. 4 is a schematic view showing, in enlargement, a preferred example of the shape of the leading edges in coupling portions of a bridge electrode.

FIG. 4 is a schematic view showing, in enlargement, a preferred example of the shape of the leading edges in the coupling portions of each of the bridge electrodes.

Each of the bridge electrodes 6 is preferably configured such that the two coupling portions 11 have first sides opposing each other and second sides remote from the respective first sides, and the second sides have corners rounded at a radius of R on the relevant electrode pads 9 as shown in FIG. 4. In other words, the second sides, which are opposite to the first sides facing the interlayer insulating film 3, have leading edges preferably formed with corner parts 16 (hereinbelow, referred to as the leading corner parts 16) rounded at a radius of R. By such rounding, the coupling portions 11 are processed so as to have no sharp part in the Y-direction. It should be noted that the first sides of the coupling portions 11, which face the interlayer insulating film 3, have corners rounded at a radius of R as well in the bridge electrode 6 shown in FIG. 4.

The inventors have evaluated the current density, which is obtained when a current flows the metal bridge electrode 6 shown in FIG. 4. The evaluation has revealed that the leading corner parts 16 are preferably rounded at a radius of at least 9 μm. When the radius is set at least 9 μm, the density of a current that flows in the vicinity of the leading corner parts can be more uniformly distributed.

This means that it is preferred to round the leading corner parts 16 at a radius of is at least 9 μm in order to prevent a current from concentrating at a part of the coupling portions 11.

Figure 5:
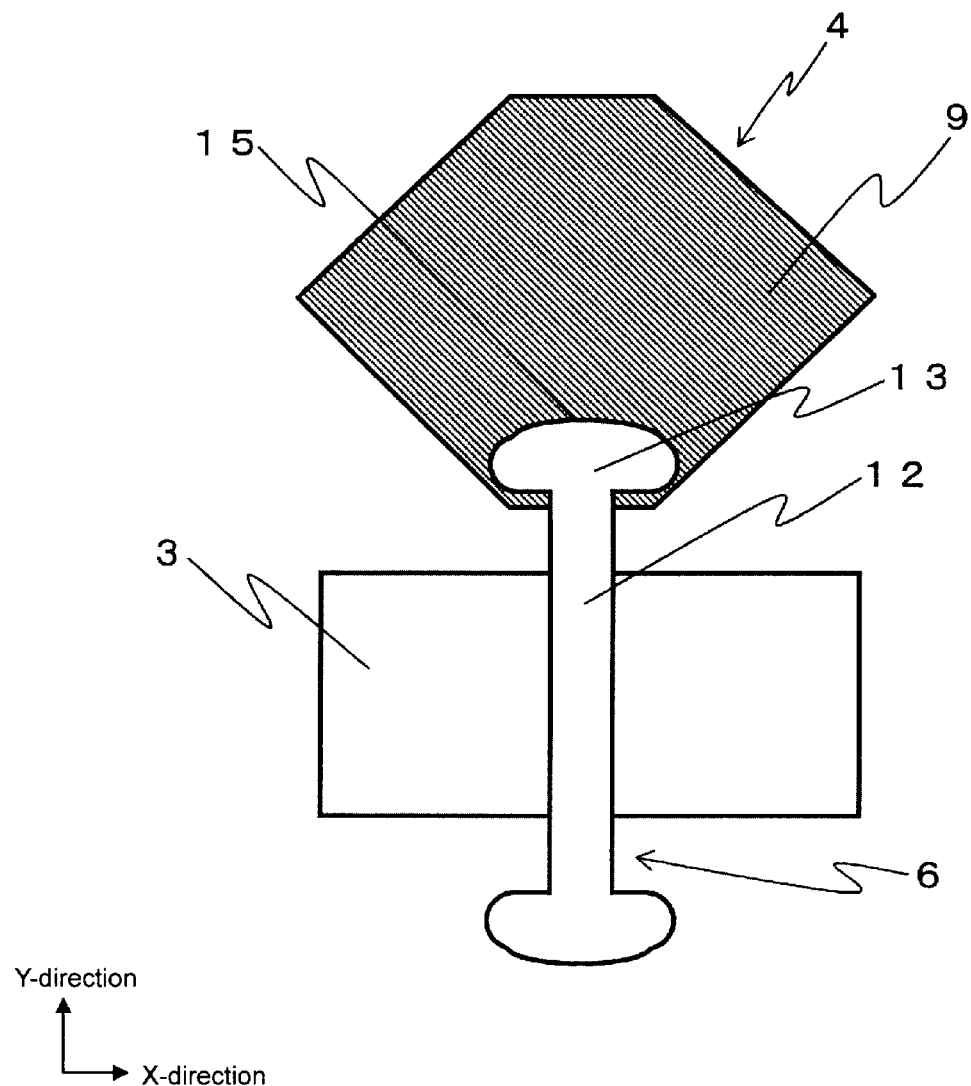
FIG. 5 is a schematic view showing, in enlargement, another preferred example of the coupling portions of the bridge electrode.

FIG. 5 is a schematic view showing another preferred example of the coupling portions of the bridge electrodes. Explanation of FIG. 5 will be made, using the same reference numerals in connection with the members or parts common to those shown in FIG. 4.

In coupling portions 13 on each of the electrode pads 9, second sides 15, which are opposite to the first sides facing the interlayer insulating film 3, are processed so as to be rounded, not to be linear. In other words, in the example shown in FIG. 4, the coupling portions 11 are formed in such a strip shape, and the second sides 14, which are opposite to the first sides facing the interlayer insulating film 3, are formed in a linear shape orthogonal to the current direction.

On the other hand, in the example shown in FIG. 5, the second sides 15 of the coupling portions 13, which are opposite to the first sides facing the interlayer insulating film 3, are formed in a rounded shape bulging out toward the current direction, not in a linear shape. By such processing, the density of the current that flows in the coupling portions 13 can be more uniformly distributed.

As shown in FIG. 3, the touch panel 1 according to this embodiment is configured such that the interlayer insulating film 3 is disposed on the second electrodes 5 at the crossing portion 8. The interlayer insulating film 3 is disposed so as to not to be brought into contact with two electrodes pads 9a and 9b of the first electrodes 4. Each of the bridge electrodes 6 connects between each pair of adjacent electrode pads 9a and 9b in the Y-direction (the vertical direction in FIG. 3), being across the interlayer insulating film 3. In this state, each of the bridge electrodes 6 is brought into direct contact with the transparent substrate 2, which is exposed between the interlayer insulating film 3 and each of the electrode pads 9a and 9b.

By making the bridge electrodes 6 out of a metal material, it is possible to increase the adhesion between the bridge electrodes 6 and the transparent substrate 2 in comparison with a case where the bridge electrodes are made of ITO material. Further, it is possible to connect the bridge electrodes 6 and the first electrodes 4 more firmly at the crossing portions 8 by making use of the adhesion between the bridge electrodes 6 and the transparent substrate 2. Thus, the metal bridge electrodes 6 are brought into direct contact with the transparent substrate 2, suppressing the occurrence of the connection failure between a bridge electrode 6 and a first electrode 4 due to peeling of the interlayer insulating film 3.

In the touch panel 1 shown in FIG. 1, each array of first electrodes 4 and each array of second electrodes 5 have a terminal (not shown) formed on one array end, and a plurality of lead-out wires 17 are connected to the respective terminals. The lead-out wires 17 may be metal wires. The lead-out wires 17 may be formed of the same material as that of the bridge electrodes 6.

Next, a process for producing the touch panel 1 according to this embodiment will be described.

Figure 6:
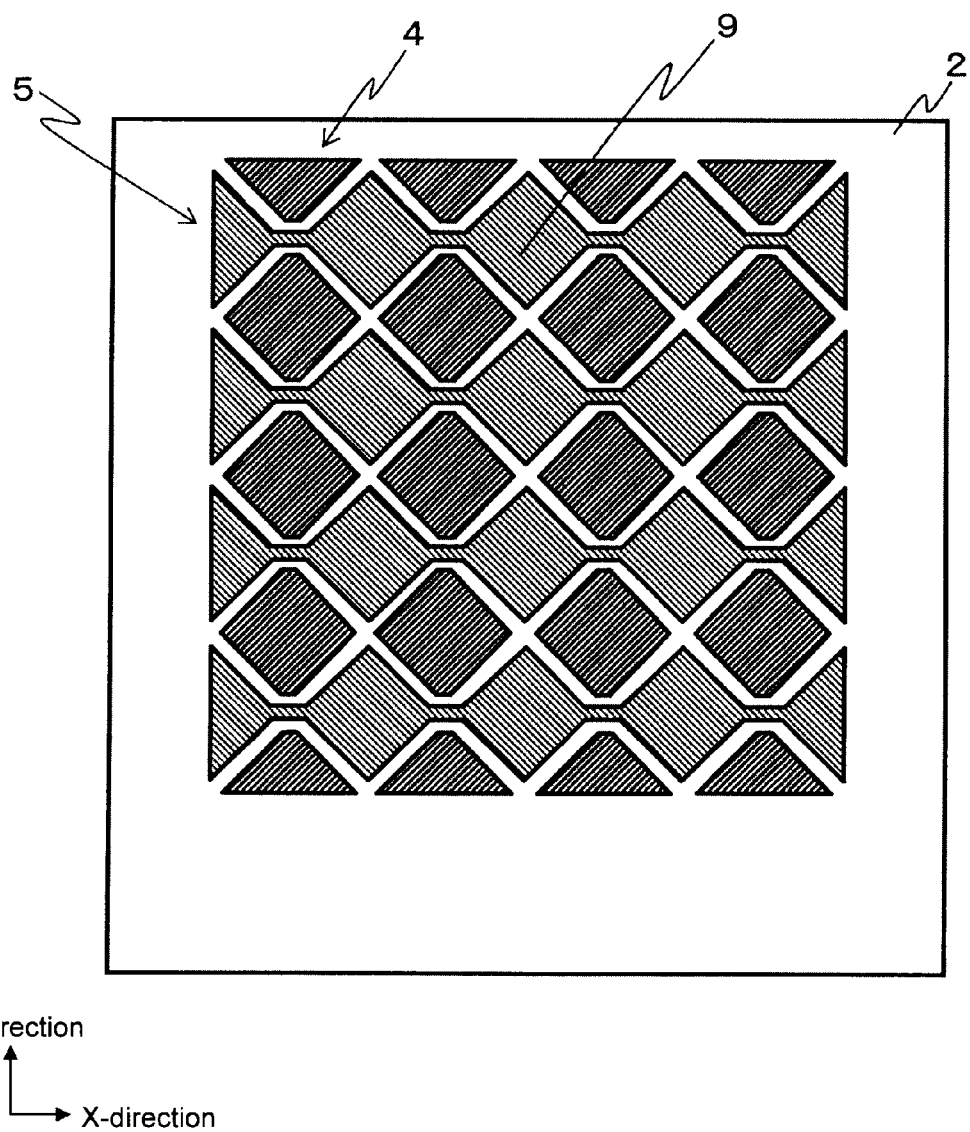
FIG. 6 is a plan view showing a substrate where first electrodes and second electrodes are disposed thereon.

FIG. 6 is a plan view showing the transparent substrate where the first electrodes and the second electrodes are disposed thereon.

First, the first electrodes 4 and the second electrodes 5 are disposed on a single side of the transparent substrate 2 as shown in FIG. 6. The electrodes may be disposed by depositing an ITO film on the transparent substrate 2 by, e.g. a sputtering method. Then, the first electrodes 4 and the second electrodes 5 may be formed so as to have a desired electrode pattern by processing the deposited ITO by making use of, e.g. a photolithographic technique.

Figure 7:
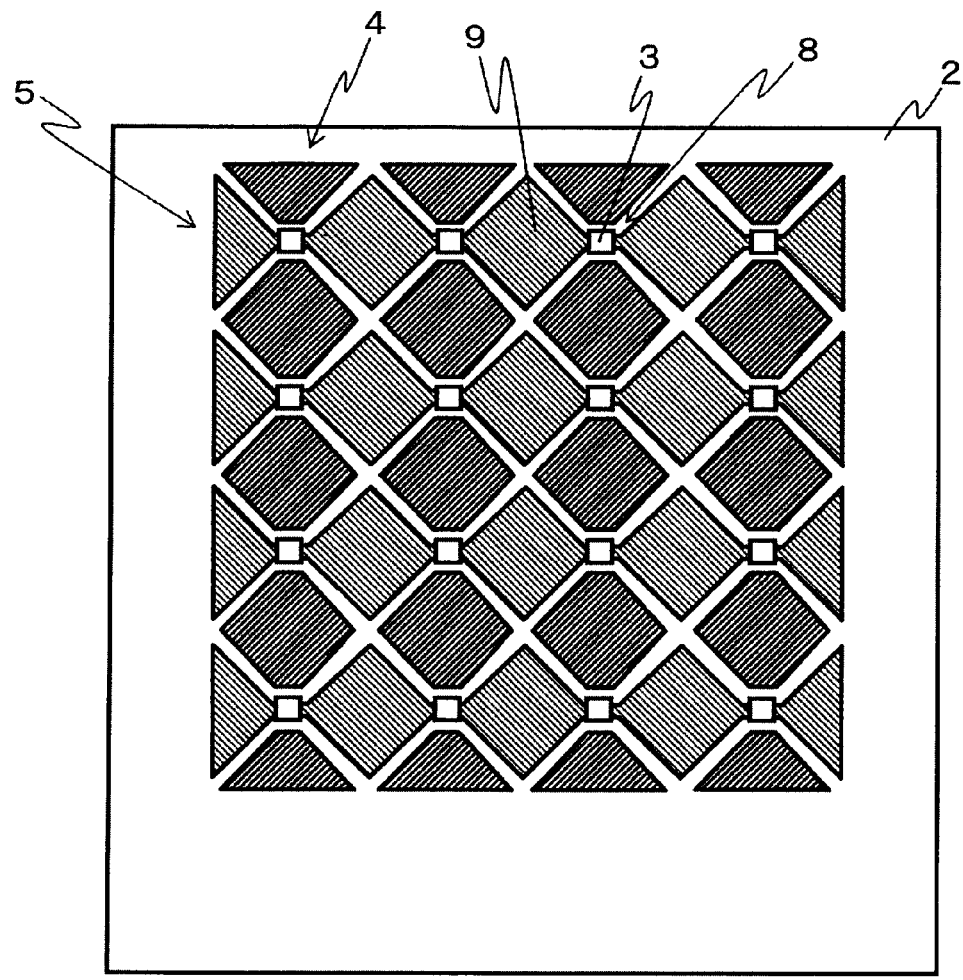
FIG. 7 is a plan view showing the substrate where an interlayer insulating film is disposed at each of crossing portions.
Figure 7:
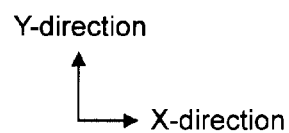

FIG. 7 is a plan view showing the transparent substrate where the interlayer insulating film is disposed at the crossing portions.

Next, as shown in FIG. 7, the interlayer insulating film 3 is disposed for the purpose of covering the connection part between adjacent electrode pads 9 of the second electrodes 5 at the crossing portions 8 where the first electrodes 4 and the second electrodes 5 cross each other. The formation of the interlayer insulating film 3 may be made by making use of a photolithographic technique. Specifically, a photosensitive acrylic resin is coated as an upper layer on the first electrodes 4 and the second electrodes 5 disposed on the transparent substrate 2, the coated acrylic resin is exposed with a mask having a desired pattern covered thereon, and etching is carried out. At that time, gaps are formed between the interlayer insulating film 3 and each of adjacent electrode pads 9 of the first electrodes 4 positioned thereabove and thereunder (in the positional relationship shown in FIG. 7) at the crossing portions 8 such that the interlayer insulating film 3 is not brought into contact with the first electrodes 4.

Next, the bridge electrodes 6 are disposed so as to connect between the electrode pads 9 of adjacent interrupted first electrodes 4, being across the interlayer insulating film 3 disposed at the respective crossing portions 8. Specifically, a metal film may be disposed onto the side of the transparent substrate 2 with the interlayer insulating film 3 disposed thereon, by use of a sputtering method. The metal film may be patterned to form bridge electrodes 6 in a desired shape on the interlayer insulating film 3 by a photolithography technique.

In the step where the metal film is patterned to dispose the bridge electrodes 6 as described above, the metal film may be simultaneously patterned so as to dispose the lead-out wires 17. Thus, it is possible to reduce the resistance of the lead-out wires 17.

In this manner, the touch panel 1 shown in FIG. 1 is obtained.

The touch panel 1 shown in FIG. 1 may include a circuit (not shown) for monitoring capacitance through the first electrodes 4 and the second electrodes 5. The circuit may be connected to the terminals (not shown) of the lead-out wires 17 through a flexible film or the like, for example. The circuit may be configured by directly mounting an IC chip on a flexible film connected to the terminals (not shown) of the lead-out wires.

Figure 8:
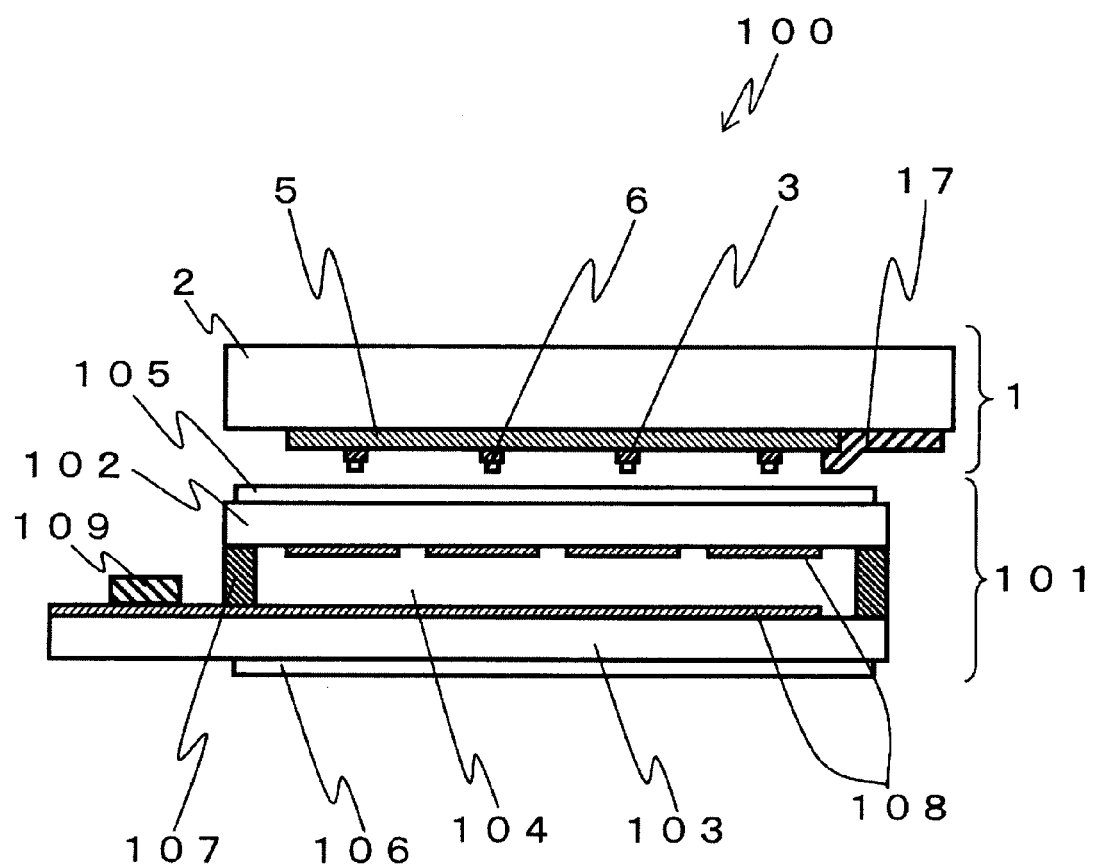
FIG. 8 is a schematic cross-sectional view showing the structure of a display having a touch panel function, which employs the touch panel according to the embodiment.

FIG. 8 is a schematic cross-sectional view showing the structure of a display having a touch panel function, which employs the touch panel according to this embodiment.

The display 100 includes the touch panel 1 and a display panel 101.

The display panel 101 is a liquid crystal display panel. The display panel 101 sandwiches a liquid crystal compound 104 between a pair of opposed transparent substrates 102 and 103. The transparent substrates 102 and 103, which are spaced from each other, are fixed together by a seal 107. The transparent substrates 102 to and 103 have transparent electrodes 108 disposed on respective sides facing the liquid crystal compound 104 in order to drive the liquid crystal compound 104. The transparent substrates 102 and 103 have polarizers 105 and 106 disposed respective sides opposite to the sides facing the liquid crystal compounds 104. The transparent electrodes 108 disposed on the transparent substrate 103 extend to a peripheral portion outside the area defined by the seal 107 from inside the area. A driving IC 109 is attached to the transparent electrodes 108.

The display having a touch panel function 100 is provided by stacking the touch panel 1 and the display panel 101 such that the side of the touch panel with the first electrodes 4 and the second electrodes 5 disposed thereon, and a viewer's side of the display panel 101 (the side with the polarizer 105 disposed thereon) face each other through an adhesive layer (not shown) made of, e.g. a UV-curable resin.

EXAMPLE

Now, the static-electricity resistance of the touch panel according to the present invention will be described based on an Example.

The touch panel 1 according to the embodiment shown in FIG. 1, and the touch panel 200 having the metal bridge electrodes 206 shown in FIG. 9 were prepared, and an electrostatic destruction test was conducted.

The prepared touch panel 1 was formed of a glass substrate having a thickness of 0.55 mm. The touch panel included an operation screen having a length of 4 cm and a width of 4 cm and had four lines of first electrodes 4 and four columns of second electrodes 5 disposed on the operation screen, the electrodes being made of an ITO film having a thickness 20 nm. The interlayer insulating film 3 was prepared by patterning a photosensitive acrylic resin by use of a photolithographic technique. The bridge electrodes 6 as well as the lead-out wires 17 were formed of a three-layer metal film, where an Mo layer containing Nb, an Al layer containing Nd and a Mo layer containing Nb were sequentially stacked from the glass substrate side in this order. The touch panel 200 was also configured in the same structure except the shape of the bridge electrodes 206.

In the test, a high voltage, which emulated static electricity, was applied to the touch panel 1 and the touch panel 200, respectively, in order to see static-electricity resistance.

The electrostatic destruction test was conducted by the Human Body Model (Charged Human Body Model) method (capacitive component: 100 pF, resistive component: 1.5 kΩ). The Human Body Model (Charged Human Body Model) method is a test method, where electrostatic destruction, which is caused by a charged human body's touching a test object, is emulated.

The measuring equipment was an electrostatic discharge simulator "ESS-2000" manufactured by Noise Laboratory Co., Ltd. The test was conducted on an insulation sheet having a thickness of 50 mm, which was put on a metal plate. The discharge gun had a leading edge formed as in a point of a sword. The two samples were tested at three different levels of high voltages of 5 kV, 10 kV and 15 kV, respectively, under conditions of a temperature of 25° C. and a humidity of 53 to 56%.

With regard to the touch panel 1 according to this embodiment, the above-mentioned electrostatic destruction test revealed that even when a high voltage of 15 kV was applied, neither disconnection nor other failure occurred between the coupling portion 11 between a first electrode 4 and its related bridge electrode 6, in other words, no trouble occurred.

On the other hand, with regard to the touch panel 200 having the metal bridge electrodes 206 shown in FIG. 9, it was revealed that although no trouble occurred in the test with 5 kV applied therein and in the test with 10 kV applied therein, disconnect occurred between a first electrode 204 and its related bridge electrode 206 in the test with 15 kV applied therein.

These rest results showed that the touch panel 1 according to this embodiment had a high resistance to a high current caused by static-electricity.

It should be noted that although the first electrodes and the second electrodes are disposed, followed by formation the metal bridge electrodes, in the embodiment, the metal bridge electrodes may be disposed, followed by formation of the first electrodes and the second electrodes. In this case, the interlayer insulating film is disposed on the bridge electrodes, followed by formation of the first electrodes and the second electrodes.

Obviously, numerous modifications and variations of the present invention are possible in light of the above teachings. It is therefore to be understood that within to the scope of the appended claims, the invention may be practiced otherwise than as specifically described herein.

The entire disclosure of Japanese Patent Application No. 2010-224404 filed on Oct. 1, 2010 including specification, claims, drawings and summary is incorporated herein by reference in its entirety.

What is claimed is:

1. A capacitive touch panel comprising:
   a transparent substrate;
   a plurality of first transparent electrodes extending in a first direction on one side of the substrate;
   a plurality of second transparent electrodes extending in a second direction crossing the first direction on the one side of the substrate with the first transparent electrodes disposed thereon;
   one of a couple of adjacent electrodes of the first electrodes and a couple of adjacent electrodes of the second electrodes at each of crossing portions having no interruption, the adjacent electrodes of the other couple being interrupted, and the adjacent electrodes of the interrupted couple being connected by a bridge electrode; and
   an interlayer insulating film disposed between the one couple and the bridge electrode,
   wherein the bridge electrode is formed of a metal material and has coupling portions disposed on the respective electrodes of the other couple interrupted at each of the crossing portions and a bridge portion connecting between the coupling portions,
   each of the coupling portions has a greater length than the bridge portion in a direction orthogonal to a direction for a current to flow into the bridge portion from an electrode of the other couple, and
   each of the coupling portions have first sides opposing each other and second sides remote from the respective first sides, the second sides having a corner rounded.

2. The capacitive touch panel according to claim 1, wherein each of the coupling portions is formed in a shape having a long axis in the direction orthogonal to the direction for the current to flow into the bridge portion from an electrode of the other couple.

3. The capacitive touch panel according to claim 1, wherein each of the coupling portions has a length of at least 40 μm in the direction orthogonal to the direction for the current to flow into the bridge portion from an electrode of the other couple.

4. The capacitive touch panel according to claim 1, further comprising a gap formed between the interlayer insulating film on the one couple and the other couple at each of the crossing portions such that the bridge electrode on the interlayer insulating film is bonded to the substrate through the gap.

5. The capacitive touch panel according to claim 1, wherein the rounded corner has a radius of at least 9 μm.

* * * * *